Oct. 9, 1962   J. R. HOLLINS   3,057,261
REFLECTOR DEVICES
Filed May 6, 1959
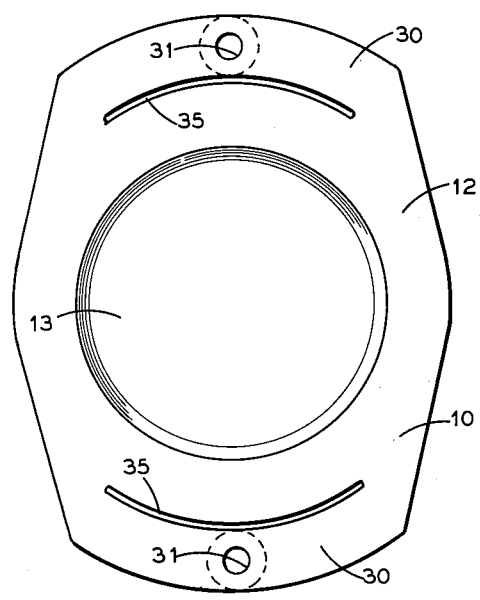
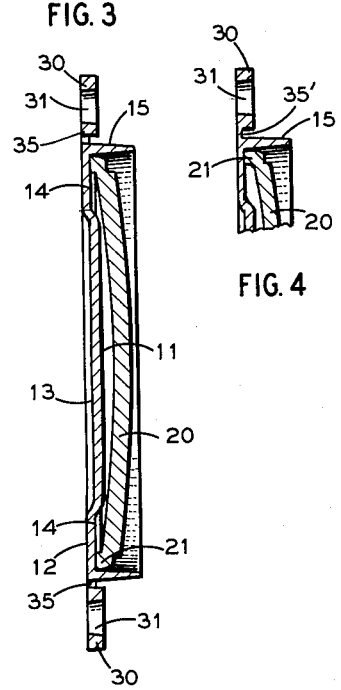
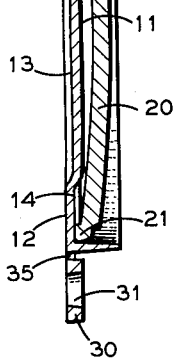
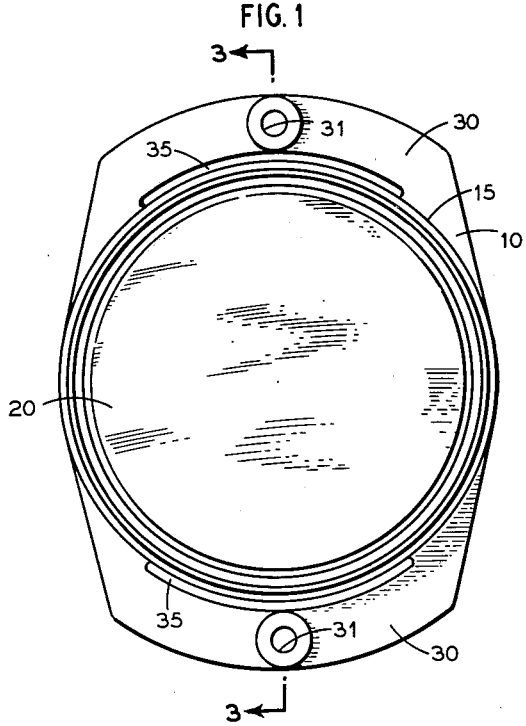
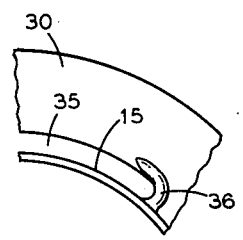
*INVENTOR.*
Jesse R. Hollins
BY
ATTORNEY

United States Patent Office 3,057,261
Patented Oct. 9, 1962

3,057,261
REFLECTOR DEVICES
Jesse R. Hollins, Brooklyn, N.Y., assignor to Signal-Stat Corporation, Brooklyn, N.Y., a corporation of New York
Filed May 6, 1959, Ser. No. 811,307
5 Claims. (Cl. 88—81)

This invention relates to reflector devices, such as used on automotive vehicles, particularly trucks and trailers. More particularly, the invention is directed to an improved sealed mounting for a reflector disk and readily applicable to curved support surfaces.

A known type of reflector device comprises a relatively flat element or mounting of a plastic composition material formed with a cylindrical rim projecting from its outer surface and arranged to have a reflector disk seated therein and sealed to such outer surface. A pair of diametrically opposite arcuate flanges extend outwardly from this rim and are formed with preferably reinforced openings to receive fastening elements, such as bolts or screws, for securing the device to a mounting surface.

This type of mounting is primarily designed for securement to a flat mounting surface, and difficulties are experienced in securing it to a curved surface. The reflector disk sealed inside the rim reinforces this portion of the mounting and resists any bending thereof. Consequently, when the flanges or flaps are conformed to a curved surface, the bending lines are at the arcuate junctions of the flaps and the external periphery of the rim. Due to the arcuate bending lines, the stress exerted on the material causes it to break at or immediately adjacent the bending line. Various attempts to correct this condition have not hitherto been successful.

In accordance with the present invention, it has been found that such breaking at the bending line can be avoided, and the mounting made readily adaptable to conform to curved surfaces, by forming elongated arcuate slots at the junction of the flaps and the rim. Alternatively, the slots, instead of opening completely through the material, may comprise greatly thinned material at the inner surface of the mounting along such arcuate junctions, and the term "slot" as used hereinafter and in the claims is intended to cover either a relatively narrow and elongated opening through the mounting or a relatively narrow and elongated zone where the material has a thickness, adjacent the base of the mounting, which is only a minor fraction of the general thickness of the mounting.

It has been further found that any tendency to breaking or tearing of the material can be further reduced by reinforcing the mounting at the ends of the slots, and this reinforcement may take the form of ribs on the outer surface of the mounting extending from the rim around the ends of the slots and inwardly a short distance along the radially outer edges of the slots.

For an understanding of the invention principles, reference is made to the following descriptions of typical embodiments thereof as illustrated in the accompanying drawings. In the drawings:

FIG. 1 is a front elevation view of a reflector device embodying the invention;

FIG. 2 is a rear elevation view thereof;

FIG. 3 is a sectional view on the line 3—3 of FIG. 2;

FIG. 4 is a partial sectional view illustrating a modified slot; and

FIG. 5 is a partial front elevation view illustrating a reinforcing rib.

Referring to FIGS. 1, 2 and 3, the reflector device is illustrated as including a generally oval mounting or base element 10 and a reflector disk 20. Mounting 10 is a generally flat piece of plastic composition material having an integral circular rim 15 projecting from its outer surface 11. Inner surface 12 of mounting 10 has a circular offset 13 extending into the well defined by rim 15 and, as offset 13 has a diameter less than that of rim 10, this forms an annular disk seating surface 14 inside rim 15.

Reflector disk 20 is an internally reflective member of any desired type, preferably of plastic composition material. It has a convex outer surface, a concave inner surface, and a seating rim 21 which is sealed against annular surface 14 in a water-tight manner. It will be noted that disk 20 acts as a rigidifier or reinforcement for the part of mounting 10 within the bounds of rim 15.

A pair of diametrically opposite arcuate mounting ears, flanges or flaps 30 project from rim 15 and have reinforced holes 31 for receiving fastening elements such as screws or bolts. In accordance with the invention, an elongated arcuate slot 35 extends along the outer periphery of rim 15 at each juncture of each ear 30 with the rim. Slots 35 permit bending of flaps or rears 30 for mounting base 10 on a curved surface without tearing or breaking of the material of the mounting at the junctions of the ears 30 and rim 15.

Alternatively, the slots may be thinned narrow elongated arcuate slots as shown at 35' in FIG. 4, the thinning providing narrow elongated arcuate membranes adjacent inner surface 12 of mounting 10.

As shown in FIG. 5, the ends of slots 35 may be reinforced by integral ribs 36 which extend outwardly from rim 15 around each end of the slots and inwardly a short distance along the radially outer edge of each slot.

While specific embodiments of the invention have been shown and described in detail to illustrate the application of the invention principles, it will be understood that the invention may be embodied otherwise without departing from such principles.

What is claimed is:

1. A reflector device for automotive vehicles comprising, in combination, a relatively flat mounting of flexible plastic composition material including a relatively thin and substantially flat base having a cylindrical rim extending from its outer surface and defining a well; said base including a pair of generally arcuate mounting ears extending in diametrically opposite directions outwardly from said rim and having arcuate inner peripheries conjointly contiguous to the major portion of the outer periphery of said rim; each ear having a hole therethrough spaced outwardly from said cylindrical rim, said holes receiving fastening elements for attachment of said ear to a mounting surface, and the material of said base being substantially thicker around the periphery of each hole to form a reinforcement therearound; a reflector disk seated in said well and sealed to such outer surface; said base being formed with a pair of relatively narrow and elongated arcuate slots each extending along an outer peripheral portion of said rim between the latter and a respective one of said reinforced holes, said outer peripheral portions being substantially diametrically opposite each other and each slot being at the junction of a respective ear with the outer perpihery of said rim; said arcuate slots facilitating bending of said ears relative to the central portion of said base having the cylindrical rim extending from its outer surface and having said lens sealed to its outer surface, whereby bending of said ears will have no effect upon the relative flatness of the portion of said base having said lens secured thereto so as not to disrupt the sealed connection between said lens and the outer surface of said base; each of said slots providing a bending zone between said cylindrical rim and the adjacent one of said reinforced holes.

2. A reflector device as claimed in claim 1 in which each slot comprises an aperture through the material of said base.

3. A reflector device as claimed in claim 1 in which each slot comprises a thinned portion of the material of said base.

4. A reflector device as claimed in claim 1 in which each slot comprises a thinned portion of the material of said base adjacent the inner surface of said base.

5. A reflector device as claimed in claim 1 in which said base is thickened at the ends of each slot to provide reinforcements inhibiting tearing of the base outwardly from the ends of the slots.

References Cited in the file of this patent

UNITED STATES PATENTS

| | | |
|---|---|---|
| 2,808,762 | De Grave | Oct. 8, 1957 |

FOREIGN PATENTS

| | | |
|---|---|---|
| 20,380 | Netherlands | Aug. 15, 1929 |
| 151,832 | Australia | June 11, 1953 |
| 741,912 | Great Britain | Dec. 14, 1955 |